United States Patent [19]
Bauer et al.

[11] Patent Number: 5,157,059
[45] Date of Patent: Oct. 20, 1992

[54] METHOD OF AND APPARATUS FOR PRODUCING A FOAMED MASS OF A POLYUREA ELASTOMER

[75] Inventors: Adolf Bauer, Olching; Franz Urban, Rohrdorf/Thansau; Josef Renkl, Markt Indersdorf, all of Fed. Rep. of Germany

[73] Assignee: Krauss-Maffei AG, Munich, Fed. Rep. of Germany

[21] Appl. No.: 851,693

[22] Filed: Mar. 13, 1992

[30] Foreign Application Priority Data

Mar. 19, 1991 [EP] European Pat. Off. ......... 91104260

[51] Int. Cl.⁵ .................................. G08G 18/00
[52] U.S. Cl. ..................... 521/163; 521/917
[58] Field of Search .................. 521/163, 917

[56] References Cited

U.S. PATENT DOCUMENTS

| | | | |
|---|---|---|---|
| 3,155,728 | 11/1964 | Lesesne | 564/505 |
| 3,236,895 | 2/1966 | Lee et al. | 564/505 |
| 3,654,370 | 4/1972 | Yeakey | 564/480 |
| 3,666,788 | 5/1972 | Rowton | 564/491 |
| 4,269,945 | 5/1981 | Vanderhider et al. | 521/159 |
| 4,904,705 | 2/1990 | Gerkin et al. | 521/163 |
| 4,910,231 | 3/1990 | Pham et al. | 521/159 |
| 4,980,388 | 12/1990 | Herrington et al. | 521/130 |

FOREIGN PATENT DOCUMENTS

| | | |
|---|---|---|
| 0045555 | 2/1982 | European Pat. Off. |
| 0070486 | 1/1983 | European Pat. Off. |
| 0081701 | 6/1983 | European Pat. Off. |
| 0135867 | 4/1985 | European Pat. Off. |
| 0219167 | 4/1987 | European Pat. Off. |
| 0279536 | 8/1988 | European Pat. Off. |
| 0286005 | 10/1988 | European Pat. Off. |
| 2327269 | 4/1981 | Fed. Rep. of Germany |
| 2948419 | 2/1985 | Fed. Rep. of Germany |
| 8622321 | 2/1988 | Fed. Rep. of Germany |
| 3825637 | 3/1990 | Fed. Rep. of Germany |
| 1551605 | 12/1968 | France |
| 63097218 | 4/1988 | Japan |
| 2086747 | 5/1982 | United Kingdom |
| 2129324 | 5/1984 | United Kingdom |

OTHER PUBLICATIONS

M. Taverna: Conference Paper UTECH 1990, pp. 70-73, "Substitution of CFCs: The Machinery Manufacturers' Contribution".

Primary Examiner—Morton Foelak
Attorney, Agent, or Firm—Herbert Dubno

[57] ABSTRACT

Through three separate passages opening in a common plane at right angles to one another into a mixing chamber, three components of a reactant polyurethane or polyurea elastomer composition to form in a mold cavity are introduced. One of the components is an aliphatic polyether amine having primary amino function and substantially free from free hydroxyl groups, catalysts with tertiary amino groups, carbon dioxide as a carbamate reactive with the polyether amine and optionally other inert gases and conventional polyurea additives. The second component is a polyisocyanate or prepolymer thereof and the third component C is water. The reacting mixture is formed through a throttle gap into the mold to form low-density foamed products under low fuming conditions and has no unreacted diisocyanates.

9 Claims, 2 Drawing Sheets

METHOD OF AND APPARATUS FOR PRODUCING A FOAMED MASS OF A POLYUREA ELASTOMER

FIELD OF THE INVENTION

My present invention relates to a method of and an apparatus for producing a foamed mass of a polyurea elastomer basis and, more particularly, to the production of polyurea elastomers in an environment in which a foaming of the mass can be effected.

BACKGROUND OF THE INVENTION

In the production of foamed products, polyurethanes have been found to be highly advantageous because of their versatility and their ability to be matched to the production requirements and the product requirements. As a result, foamed polyurethanes have achieved world-wide significance in the industrial polymer field. The production of polyurethanes utilizes a variety of techniques.

One of the most important factors in modern polyurethane technology is the need to avoid the use of fluorochlorohydrocarbons as expanding or foaming agents, because of the detrimental effect of such compounds upon the environment. More expensive replacement products may be uneconomical.

The use in the past of halogen-free foaming agents, especially carbon dioxide on ecological grounds, has been found to be desirable although economic factors have hitherto made such use less than attractive. In spite of considerable research, the use of carbon dioxide frothing as a replacement for fluorochlorohydrocarbon foaming has not been found to be fully satisfactory as will be apparent from M. Taverna, Conference paper UTECH 1990, pages 70–73.

Problems have also been encountered with other expanding gases used in foaming, particularly with respect to changes in polyurethane technology which are required when such gases are used. For example, an improvement in product quality is required, for instance to drastically increase the life span of the molded products which are produced. It is also necessary to improve the load-carrying capacities of such products and the aging characteristics thereof.

Apart from quality factors, a reduction in the problem with respect to fumes and fogging in the industrial application of polyurethanes, which also can affect the consumer, is necessary. For example, efforts have been required to ensure that all of the additives which are not chemically fixed in the polymer matrix should be removed or eliminated to avoid the fume or fogging problems. As a practical matter, therefore, aspects of workplace hygiene, toxicology and ecology have affected the industry detrimentally. Nonreacted isocyanates, phthalates serving as solvents for certain additives, partly volatile metallo-organic compounds and even certain amine catalysts have contributed to these problems.

However, the efforts to avoid volatile components as much as possible during production and in the finished product have not resulted in qualitative improvements in the products. They have been only limitedly successful in workplace improvements from the aspect of hygiene, toxicology and ecology. Nevertheless considerable efforts are being expended in this aspect of foam plastic technology.

There is a considerable world-wide effort under way to find new raw materials with the aid of which the aforementioned problems in foam technology can be resolved. For example, considerable effort is under way to develop high molecular weight polyols a starting materials for polyurethane foam technology.

In more recent technical literature, a trend can be discerned toward the use of polyether amines as reaction components for use in the production of polyurethanes. By contrast to classical polyols which have at least two free hydroxyl groups per molecule, the polyether amines have, instead of free hydroxyl groups or residues, primary or secondary aliphatic amine or primary aromatic ammine residues.

In R.D. Priester, R.D. Peffley and R.B. Turner; *Proceedings of the SPI-32nd Technical Marketing Conference,* San Francisco, 1989, the use of aminopolyols with secondary aliphatic or primary aromatic amino functionality, is described for the production of foamed polyurea compositions of low bulk density. It has been shown that these materials have significant advantages by comparison with conventional polyurethane foam components in many ways.

These advantages include increased load-carrying capacity and improved aging characteristics as well as an improvement in resistance to flammability.

In EP-A 0 279 536, long-chain aliphatic oligofunctional secondary amines are reacted with polyisocyanates in the presence of conventional catalysts and additives to produce polyurea foams which are not further characterized.

This technique is characterized by improvement in many of the requirements outlined above and thus is considered a true advance in the art. However, it does not satisfy the need to eliminate classical additives such as tin-containing compounds and amine catalysts which contribute to the toxicity and fogging problems noted above. Furthermore, the technique has a further disadvantage which has limited its applicability, namely, the problem of obtaining the polyether amines. Up to now the production of polyether amines by simple methods which are both economically and technologically suitable for widespread use in polymer technology has not been possible. This disadvantage results in means that the raw material caused output and/or the chemical integrity of the resulting product could not be guaranteed.

The production and use of mixtures of polyether amines having secondary amine functional groups in the production of foamed polyurea compositions is described at many locations in the literature. Large-chain aliphatic oligofunctional primary amines (U.S. Pat. No. 3,654,370) can be subjected to reaction by alkoxylation, cyanethylation, alcohol aminylation and reductive catalytic aminylation.

Alternatively, short-chain primary aliphatic amines can be subjected to a catalytic reaction with polyoxyalkylene compounds (U.S. Pat. No. 3,654,370) to long-chain aliphatic oligofunctional secondary amines (U.S. Pat. No. 4,904,705).

It has been proposed further to produce aromatic polyether amines in a variety of processes, for example, by reacting commercially-available polyhydroxy polyethers with isatic acid anhydride in one or more steps. In this sense, DE-A 29 48 419 describes the transformation of commercially-available polyhydroxy polyethers with aromatic diisocyanates into prepolymers, with subsequent hydrolysis of the remaining isocyanate products to yield an aminopolyol with terminal amino groups bound to aromatic residues.

In the polymer chemical field it is known that the product characteristics of polymers can be better controlled and influenced if the raw materials used are homogeneous and invariant. This applies as well for the formulation and product characteristics of polyurethane polymers under discussion. It is, therefore, important to avoid statistical distribution and differently substituted amines in the raw materials employed and this can be achieved by utilizing reactive terminal groups.

With the teachings of DE-A 38 25 637, albeit at increased cost, it is possible to obtain highly uniform and invarient, long-chain aliphatic oligofunctional secondary amines. This is achieved by hydrogenation of Schiff bases produced from ketones and oligofunctional primary polyoxypropylene amines.

Oligofunctional polyoxypropanol amines with terminal primary amine groups are used in accordance with DE-A 38 25 637 to produce polyether amines with secondary amino groups and are commercially available under the designation JEFFAMINE ® (Texaco). The molecular weight of this starting material is in the range of 230 to 8,000 and its amine functionality lies between 1 and 3.

These compounds are produced, for example, as described in U.S. Pat. No. 3,654,370, in a single step from commercially-available petrochemical compounds, namely, dioxypropylenepolyols and ammonia.

A direct use of such products for the production of foamed polyurea compositions of low bulk density is advantageous on both economical and technological grounds because these compounds have an especially high degree of amination and high compositional consistency with respect to their terminal groups. It is also an advantage that the formation of polyol compounds does not result in a significant reduction of esters, urethanes or ethoxy residues; indeed these residues can be completely avoided in most instances.

In the literature, the use of aliphatic polyether amines with primary amino function is described for the production of hard elastic foamed polyurea compositions of high bulk density. In fact, the literature teaches that the extremely high reactivity of these polyether amines precludes the formation of foamed polyurea compositions of low bulk density.

In the production of "foamed" polyurea compositions with such high bulk densities (800 to 1,300 kg/m$^3$), the reaction times of a maximum of 2 to 3 seconds must be observed with the use of such primary oligofunctional long-chain aliphatic amines, because the liquid raw material solidifies in such a short time into solid and no longer flowable masses.

In EP-A 0 081 701 and U.S. Pat. No. 4,269,945, the addition of a blowing or foaming agent to this process is described. The result is an improvement in the product characteristics, namely, the surface quality of the hard elastic foam body which results. With this approach, microcellular "foams" can be obtained with a high bulk density of greater than 800 kg/m$^3$. In this process, the use of permanent dried gases, especially nitrogen or air, has been found to be advantageous. The process has been described as "nucleation". While in connection with this approach, the use and/or collateral effect of autogenously produced carbon dioxide has been proposed it has not resulted in any practical applications because it has been accompanied in the past with an extremely rapid reaction rate predominantly causing the reaction mixture to harden into a nonflowable mass. The velocity of the reaction is far more rapid than the much slower catalytic reaction of water with isocyanates.

U.S. Pat. No. 4,910,231 describes the reaction of a primary amino group containing polyether amines with an excess of polyisocyanate and water to form a hard foam which is not unlike the hard foams described with their disadvantages.

OBJECTS OF THE INVENTION

It is the principal object of the present invention, therefore, to provide an improved method or process for the formation of polyurea/polyurethane foams from polyether amines with primary amino groups and polyisocyanates to yield, with sufficient reaction time and a more satisfactory reaction rate, foamed products with lower density and more advantageous properties as regards freedom from the release of toxic substances, elasticity, demoldability, content of unreacted diisocyanates and the like by comparison with earlier processes.

Another object of this invention is to provide an improved apparatus for producing improved foam polyurea compositions with the latter advantages.

Still another object of the invention is to provide a method of producing polyurea foams whereby drawbacks of earlier techniques are avoided.

SUMMARY OF THE INVENTION

These objects and others which will become apparent hereinafter are attained, in accordance with the invention, in a process for producing a foamed composition based upon polyurea elastomers and in which, with intensive mixing, there are reacted:
(a) aliphatic polyether amines, with primary amino functionality and substantially devoid of free hydroxyl groups,
(b) polyisocyanides including prepolymers thereof,
(c) water, and
(d) catalysts with tertiary amino groups, in the presence of
(e) carbon dioxide and optionally other, inert halogen-free gases and optionally also in the presence of
(f) customary polyurea additives whereby the carbon dioxide at least partly is formed by the reaction of carbamate with the aliphatic polyether amines and in which the intensive mixing is effected through the use of a mixing head with
(g) a cylindrical mixing chamber,
(h) three component supply ducts or passages for the components A, B and C, whereby component A consists of the reactants a, d, e and f with the carbon dioxide present as a carbamate reacting with aliphatic polyether amine, the component B as the substance d and the component C as water,
(i) a reversible displaceable piston is provided in the mixing chamber for synchronous control of the passage opening into the mixing chamber and
(k) a throttle gap is provided at the outlet opening of the mixing chamber.

Stated otherwise, the method can comprise the steps of:
(a) forming a component A by combining at least one aliphatic polyether amine having primary amine functional groups and substantially devoid of free hydroxyl groups, a catalyst for polyurea elastomer formation having tertiary amino groups, carbon dioxide at least in part produced by reaction of carbamate with the aliphatic polyether amine and optional inert gases, and optional polyurea additives;

(b) forming a component B as a polyisocyanate reactive to produce the polyurea elastomer or a prepolymer of the polyisocyanate;

(c) forming as a component C, water reactive to produce the polyurea elastomer;

(d) separately continuously feeding the components A, B and C through three separate passages into an elongated mixing chamber of a mixing head having a mixing chamber piston displaceable in the mixing chamber, and intensively mixing the components A, B and C in the chamber to form a mixture;

(e) controlling the feeding of the components A, B and C into the mixing chamber from the passages by axially shifting the mixing chamber piston therein;

(f) discharging the mixture from a mouth of the mixing chamber into a discharge chamber;

(g) during discharge of the mixture from the mixing chamber into the discharge chamber, partly obstructing the mouth to form a throttle gap through which the mixture is forced; and (h) delivering the mixture from the discharge chamber into a chamber to enable the mixture to foam into a mass of the polyurea elastomer.

Preferably the pressure in the component feed passages directly before they open into the mixing chamber is between 80 and 180 bar. Most advantageously, the pressure in the component passages for components A and B immediately upstream of their discharge into the mixing chamber ranges from 140 to 160 bar and the pressure in the passage for component C directly before it opens into the mixing chamber is in the range of 80 to 110 bar.

Advantageously, the temperature of the components A, B and optionally C directly before discharge into the mixing chamber is in the range of 20° to 60° C. From the point of view of product quality, it is most advantageous to provide for the component C a temperature in the range of 90° to 120° C.

The components A, B and C are fed at such rates and the mixing chamber and the throttle gap are so diminished that the outlet or discharge velocity of the component mixture is in the range of 8 to 16 m/s.

According to the apparatus aspect of this invention, the throttle gap is formed by a transverse slider in the discharge chamber into which the mixing chamber opens at a right angle. Alternatively that throttle gap is formed by a constriction in the flow passage of the die or mold into which the foamable mass is injected for foaming.

The apparatus can comprise:

means forming a cylindrical mixing chamber having a mouth at one end, a mixing chamber piston displaceable from an opposite end in the mixing chamber and a mixing region between the mouth and the piston;

a first passage opening into the mixing region for feeding thereto a component A formed by combining at least one aliphatic polyether amine having primary amine functional groups and substantially devoid of free hydroxyl groups, a catalyst for polyurea elastomer formation having tertiary amino groups, carbon dioxide at least in part produced by reaction of carbamate with the aliphatic polyether amine and optional inert gases, and optional polyurea additives;

a second passage opening into the mixing region for feeding thereto a component B formed from a polyisocyanate reactive to produce the polyurea elastomer or a prepolymer of the polyisocyanate;

a third passage opening into the mixing region independently of the first and second passages and in addition thereto for feeding into the region as a component C, water reactive to produce the polyurea elastomer, the components A, B and C intensively mixing in the chamber to form a mixture;

means for controlling the feeding of the components A, B and C into the mixing chamber from the passages by axially shifting the mixing chamber piston therein, the mixture being discharged from the mouth of the mixing chamber; and means for partly obstructing the mouth to form a throttle gap through which the mixture is forced into a chamber to enable the mixture to foam into a mass of the polyurea elastomer.

When a calming chamber is used with a larger cross section than the mixing chamber, it also can be provided with a reversible piston or plunger which can be positioned ahead of the mouth of the mixing chamber to form the adjustable throttle gap.

It has been found to be advantageous to have the component passages located in the same plane but at angles of 90° between them.

The polyether amines which may be used can be aliphatic polyether amines known in the art and substantially devoid of free hydroxyl groups and whose amino functions are primary amine groups. Mixtures of these aliphatic polyether amines can be used. The polyether amines can include other polyether amines which are free from hydroxyl groups and can have secondary amino functionality, such other polyether amines also being known in the art but can be present only in an amount up to 65% of the aliphatic polyether amine with primary amino function. Upon the addition of such secondary polyether amines, which are less reactive than the primary aliphatic polyether amines, the reaction time to achieve the desired product characteristics may have to be adjusted.

Preferably the polyether amines corresponding to the Formula I

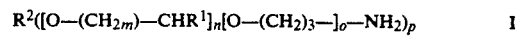

$$R^2([O-(CH_2)_m-CHR^1]_n[O-(CH_2)_3-]_o-NH_2)_p \quad I$$

in which

R$^1$ is hydrogen and m an integer which may be 1 or 3 or

R$^1$ is methyl and m is the integer 1, n is an integer in the range of 1 to 100 o is 0 or 1 and R$^2$ is a di-bonding residue according to one of the Formulas IIa to IIc

$$-CH_2-CHR^3- \quad (IIa)$$

$$-CH_2CH_2CH_2CH_2- \quad (IIb)$$

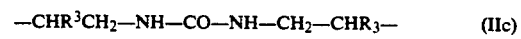

$$-CHR^3CH_2-NH-CO-NH-CH_2-CHR_3- \quad (IIc)$$

in which

R$^3$ is hydrogen or methyl, and p is the number 2 or

R² is a tri-bonding residue according to one of the Formulas IIIa to IIIc:

CH₃—C(CH₂—)₃  (IIIa)

CH₃—CH₂—C(CH₂—)₃  (IIIb)

(—CH₂)₂CH—  (IIIc)

and p is the number 3.

The production of the polyetheramine of Formula I is described, for example, in U.S. Pat. No. 3,654,370. As there described, polypropyleneglycolether is reacted with ammonia and hydrogen in the presence of appropriate catalysts. The functionality of the resulting products can be influenced by introducing as starters for the polypropyleneglycolether, low molecular weight diols or triols. Usually these are ethyleneglycol, propyleneglycol, butanediol, glycerine, trimethylpropane and the like which are initially ethoxylated and/or propoxylated. These compounds can be "the JEFFAMINE polyoxyalkylene amines", distributed by Texaco Chemical Company, Houston, Tex.

Other starters which can be used include polyethyleneglycol or polymerized 1,4-butanediol which can be subjected to propoxylation and which may be employed to modify the crystallinity, flexibility and/or water take-up characteristics of the product.

In the process of the present invention, polyether amines can be employed which have primary amino function and which are the result of cyanoethylation of polyhydroxypolyols with acrylonitrile and subsequent catalytic reduction (see DE-B 1 193 671). Other processes for producing the polyether amine with primary amino function as can be used in the present invention are described in U.S. Pat. No. 3,155,728, U.S. Pat. No. 3,236,895 and FR-A 1,551,605.

Especially preferred polyether amines with primary amino groups are those which predominantly or exclusively contain propyleneoxy groups, i.e. those which are propyleneoxide compounds in which the propyleneoxy groups have replaced reactive hydroxy groups since these produce products with the best characteristics, i.e. reduced water pick-up, high flexibility, etc.

If it is desirable for the foamed product to have a high water pick-up and an increased crystallinity, polyether amines with primary amino groups are employed which have a greater proportion of ethyleneoxy or butyleneoxy units or only such units, optionally in admixture with the aforedescribed polyether amines with propyleneoxide units.

As has already been indicated, together with a primary amino function, we may add secondary amino function polyether amines. The latter can be of the type described in U.S. Pat. No. 3,666,788, U.S. Pat. No. 3,155,728 and German Patent document DE-A 38 25 637. With the use of these accompanying polyether amines, the following terminal group and/or residue substituents are preferably employed: 2-hydroxyethyl, 2-hydroxypropyl, propionitrile or the alkyl residues n-butyl s-butyl, i-butyl, 1,3-dimethyl-1-pentyl and cyclohexyl.

As has also been stated previously, the preferred aliphatic polyether amines with primary amino groups which are used according to the invention, are those which contain propyleneoxy units in accordance with the Formula I and best results are obtained where R¹ is methyl, n is 1 and R², R³, n, o and p are as defined above.

According to a further feature of the invention, polyether amines with primary amino groups which are used have molecular weights in the range of 200 to 12,000.

The polyisocyanates used in accordance with the invention can have, as carrier groups, aromatic, aliphatic and/or mixed aliphatic/aromatic groups. Typical examples of the polyisocyanate compounds used in accordance with the invention are straight-chain aliphatic diisocyanates like 1,4-diisocyantobutane, 1,5-diisoscyanatopentane, 1,5-diisocyanatohexane or the like.

The cycloaliphatic diisocyanates are preferably 1,4-diisocyantocyclohexane or isophoronodiisocyanate or isomer mixtures thereof. A variety of aromatic diisocyanates ca also be included. Suitable isomer mixtures are mixtures of 2,4-diisocyantotoluene and/or 2,6 diisocyanatotoluene (so-called TDI isomer mixtures), isomer mixtures of 2,2'- or 2,4'- and/or 4,4' diisooyanatodiphenylmethane (so called MDI isomer mixtures), isomer mixtures containing 2,4-diisocyanato-1-chlorobenzene and isomer mixtures of diisocyanatoxylenes and the like. A detailed listing of commercially available suitable polyisocyanates can be found at G. Oertel, Kunststoffhandbuch, Band VII (Polyurethane), Carl-Hanser-Verlag, München und Wien 1983, especially at pages 63–73 thereof. Preferred are the aforementioned TDI and MDI types and especially the MDI types, optionally in admixture with the TDI type.

With the MDI types, preferably such mixtures are used which contain either reduced quantities of high homologs resulting from the synthesis of these compounds or carbodiamide derivatives of commercially available MDI-type compounds and is likewise a commercial product.

In the diisocyanate compound, we include prepolymers, especially MDI prepolymers such as described in U.S. Pat. No. 4,737,919 and which can be obtained by reacting diisocyanates and primary long-chain aliphatic amines. It has been found to be advantageous, in accordance with the invention, that these products need not be separately produced and recovered but can be generated during the injection process in a suitable device in an "on-line" manner.

The prepolymers can also be added in admixture with the "monomeric" polyisocyanates.

Workers in the art are aware that, to generate optimum characteristics in the foamed polyurethane plastics, so-called "hard segments" must be obtained in the polymer matrix on morphological grounds. It is further known that, for this purpose, especially aromatic polyisocyanates can be reacted with water with the aid of appropriate catalysts. In the course of this reaction of the polyisocyanates and water, carbamic acid which results from a dicarboxilation of the primary aromatic amine and carbon dioxide are formed. While the primary aromatic amine reacts spontaneously with further isocyanate to form polymeric urea compounds, constituting the hard segments, the autogenously-generated carbon dioxide forms an expanding gas. It is, therefore, possible to utilize this technique for producing the entire quantity of the expanding gas of the invention but with the disadvantage that an undesirable high proportion of the hard segment will result.

For ideal product properties, therefore, it is advantageous to avoid generating excessive proportions of the hard segment and hence autogenously-formed expanding gases, so that the residual requirements for expanding gas according to the prior art, is usually supplied by easily vaporizable liquids. For this purpose, in the past fluorochlorohydrocarbons have been used.

One of the advantages of the invention, pointed out above, is that such fluorochlorohydrocarbons need not be used, and it is an important aspect of the invention that carbon dioxide is used as the expanding agent optionally in the presence of inert gases like nitrogen or air.

According to the invention, these gases can be supplied with precisely predetermined quantities to the polyether amine component under pressure. While there will be a reaction of at least a part of the supplied carbon dioxide with the polyether amines to form carbamates, this serves to reduce the extreme radioactivity of the polyether amines to a practical level. The mixture will contain, optionally, carbon dioxide bonded to the carbamate apart from dissolved carbon dioxide. The nucleated polyether amine which thus results is then fed to the reaction system through the respective passage. This ensures that during the foaming phase, there will not be an uncontrolled loss of gas during the mixing.

In the process of the invention, moreover, there is also a formation of hard segment components by the catalytic decomposition of excess isocyanate with water. For this purpose, such catalysts are used which accelerate the isocyanate-water reaction as selectively as possible. The catalysts are from the class of blowing catalysts which have a boiling point of at least 190° C. or chemically are bound in the polymer matrix. These characteristics are important for effecting the process of the invention as well as of great significance in avoiding or reducing toxic emissions and the fogging characteristics of the foamed products.

The preferred catalysts are those used in polyurethane chemistry and are tertiary amines. The types and effects are found in "Kunststoffhandbuch", Band VII (Polyurethane), especially at pages 92–98.

According to a preferred embodiment of the invention, the catalysts having tertiary amino groups conform to the Formula IV

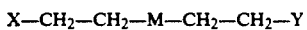
$$X-CH_2-CH_2-M-CH_2-CH_2-Y \quad (IV)$$

in which M is an oxygen atom or a methylamino group X and Y can be the same or different and are selected from the group which consists of N-morpholinyl-,N-azanorbornyl-,dimethylamino and dimethylaminoethyl groups or X is one of these groups and Y is an hydroxyl group or an N-methyl-N-(2-hydroxy-$C_1$- to $C_2$-alkyl)-amino group.

Especially preferred catalysts include 2,2-dimorpholinoethylether, 2-(2-dimethylamino)ethoxyethanol, bis-(2-dimethylaminoethyl-)ether, 2-(2-dimethylamino-ethyl-)-2-methylaminoethanol and 2-(2-(dimethylaminoethoxy)-ethyl-methyl-aminoethanol.

Typical examples of the catalysts are:
Bis-(2-dimethylaminoethyl-)ether
2,2-dimorpholinodiethylether
2-(2-(dimethylaminoethoxy)-ethyl-methyl-amino-ethanol
2-(2-dimethylaminoethoxy-)ethanol
N,N,N',N',N''-pentamethyldiethylantriamine
Bis-(azanorbornylethyl-)ether, (DE-A 37 07 911)
2-(2-hydroxyethoxy-)ethyl-azanorbornane, (DE-A 37 07 911)
2-(2-dimethylaminoethyl-)-2-methylaminoethanol
N,N,N'-trimethyl-N'(ethoxyethanol)ethylendiamine.
(U.S. Pat. No. 4,582,983)
2,5,11-trimethyl-2,5,11-triaza-8-oxa-dodecane (U.S. Pat. No. 4,582,983).

(Unless otherwise indicated, the compounds are commercially available.)

A highly preferred catalyst containing a tertiary amino group is 2,2,4-trimethyl-1-oxa-2-sila-4-aza-cyclohexane.

According to a particularly advantageous embodiment of the invention, the catalyst or catalysts can be used in amounts of 0.01 to 5 phr with respect to the polyether amine. The catalysts are preferred dissolved in water and supplied to the reaction system as aqueous solutions. The quantity of water is so calculated that it conforms to an aliquot of the polyisocyanate quantity required for formation of the desired amount of the hard segment and to produce autogenously the blowing gas. The quantity of water actually used can be a many-fold excess over this quantity.

Since, according to the invention products which are especially fume-free can be generated, it has been found that many of the catalysts which have been found to be problematical in the polyurethane field because of their fume activity, for example 1,4-diazabiacyclo(2,2,2)octane, dimethylethanolamine, dimethylcyclohexylamine, methylazanorbornane and the like, can be employed.

According to a further feature of the invention, apart from the so-called blowing catalyst mentioned above, other catalysts are not required although it was common practice in polyurethane chemistry to employ such other catalysts, for example, metallo-organic catalysts. As we have indicated previously, it is not a disadvantage that a water excess is present over the amount calculated to be necessary. As a consequence, the free polyisocyanate content in the end product can be reduced to a minimum.

In the process of the invention, conventional polyurethane or polyurea additives can be employed as is described at Kunststoffhandbuch, Band VII (Polyurethane), especially pages 100 to 109 thereof. Typical examples of such additives are foam stabilizers, antiflammability agents, antiaging agents, inert mineral inorganic or organic fillers, inert parting agents enabling separation of the foamed mass from the mold in which it is injected, and the like.

For carrying out the process of the invention, we preferably use a mixing head of the type described in German Patent 23 27 269 or as described in the aforementioned publication of M. Taverna, especially page 70. This mixing head need be modified only to provide a further inlet for the water/catalyst mixture. According to the invention, separate streams of the aliphatic polyether amine containing carbon dioxide bound up as carbamate and optionally soluble carbon dioxide inert halogen-free blowing gases as well as possible conventional polyurea additives, the polyisocyanate including prepolymers thereof and the catalyst in admixture with water so that the resulting mixture is formed within the cylindrical mixing chamber. The reactive mixture flows from the mouth of the mixing chamber through the throttle gap. It is thus possible to supply the catalyst separately or in whole or in part together with the polyether amines.

To reduce the viscosity and/or adjust the reaction time, it is advantageous to heat the reagent streams before they enter the chamber.

It has also been found to be advantageous to carry out the reaction at superatmospheric pressure.

With the use of a mixing head having a throttle gap in the manner described, foamed elastic polyurea losses of a bulk density in the range of about 20 to 300 g/l can be produced. The streams of the components of their action can interact in a one-shot system according to the invention.

SPECIFIC EXAMPLES

In the following examples, the process is carried out in a mixing head of the type illustrated in FIGS. 1 and 2 and described below, the mixing head having three separate feed passages for three different streams.

EXAMPLE 1

|  | Material | Weight % | Density |
|---|---|---|---|
| Stream 1: | Jeffamine T 5000[1] | 80 | |
|  | Jeffamine D 2000[2] | 2 | |
|  | Tegostab B 4690[3] | 1 | |
|  | Texacat ZF 20[4] | 0.1 | |
|  | Carbon dioxide | 2.7[5] | |
|  |  | 103.8 | 1.034 |
| Stream 2: | Suprasec VM 25[6] | 54 | 1.175 |
| Stream 3: | Water | 4 | 1.000 |

[1] Product of Texaco Chemical Company, polyoxypropylenetriamine, amine equivalent: 52 mVal/g
[2] Product of Texaco Chemical Company, polyoxypropylenediamine, amine equivalent: 98 mVal/g
[3] Product of Th. Goldschmidt AG, Silicone
[4] Product of Texaco Chemical Company, Bis-(2-dimethylaminoethyl-)ether
[5] At a nitrogen pressure of 5 bar, gaseous carbon dioxide is introduced until the volumetrically calculated amount has been taken up.
[6] ICI modified MDI 24.3 weight % NCO content.

The streams 1, 2 and 3 are combined in the high-pressure mixing head to produce a compact foamed material in a closed mold after injection.

|  | Test 1 | Test 2 |
|---|---|---|
| Components Temperature, °C./Pressure (bar) |  |  |
| Stream 1 | 40/150 | 43/150 |
| Stream 2 | 28/150 | 30/150 |
| Stream 3 | 20/90 | 50/90 |
| Outlet velocity at throttle gap of mixing heat | 12 m/s |  |
| Mold temperature, °C.: | 70 | 70 |
| Injection weight, g: | 500 | 450 |
| Mold volume, ml: | 7320 | 7320 |
| Mold rise time, Sec.: | 40 | 36 |
| Tack-free time, Sec.: | 180 | 170 |
| Removal time, Sec.: | 240 | 240 |
| Bulk density, kg/m³: after compression and cooling. | 65 | 57 |

Molar ratio of $NH_2$ groups of the polyether amine to the NCO groups in this example was 1:5.12 and the molar ratio of the surplus NCO groups to water was 1:1.77.

EXAMPLE 2

|  | Material | Weight % | Density |
|---|---|---|---|
| Stream 1: | Jeffamine T 5000[1] | 80 | |
|  | Jeffamine D 2000[2] | 20 | |
|  | Tegostab B 4690[3] | 1 | |
|  | Texacat ZF 20[4] | 0.1 | |
|  | Carbon dioxide | 2.7[5] | |
|  |  | 103.8 | 1.034 |
|  | + After charging with $CO_2$ to Density (42%) |  | 0.601 |
|  | Nucleation) |  |  |
| Stream 2: | Suprasec VM 25[6] | 48 | 1.175 |
| Stream 3: | Water | 4 | 1.000 |

[1] Product of Texaco Chemical Company, polyoxypropylenetriamine, amine equivalent: 52 mVal/g
[2] Product of Texaco Chemical Company, polyoxypropylenediamine, amine equivalent: 98 mVal/g
[3] Product of Th. Goldschmidt AG, Silicone
[4] Product of Texaco Chemical Company, Bis-(2-dimethylaminoethyl-)ether
[5] At a nitrogen pressure of 5 bar, gaseous carbon dioxide is introduced until the volumetrically calculated amount has been taken up.
[6] ICI modified MDI 24.3 weight % NCO content.

The streams 1, 2 and 3 are combined in the high-pressure mixing head as described and injected into a closed mold to produce a compacted foam body.

Molar Ratio $NH_2:NCO = 1:4.55$; NCO (Excess): Water 1:2.05

|  | Test 3 |
|---|---|
| Components Temperature, °C./Pressure (bar) |  |
| Stream 1 | 40/150 |
| Stream 2 | 28/150 |
| Stream 3 | 20/90 |
| Outlet velocity at throttle gap of mixing heat | 12 m/s |
| Mold temperature, °C.: | 70 |
| Injection weight, g: | 350 |
| Mold volume, ml: | 7320 |
| Mold rise time, Sec.: | 40 |
| Tack-free time, Sec.: | 180 |
| Removal time, Sec.: | 240 |
| Bulk density, kg/m³: after compression and cooling. | 44 |

The foam material produced in tests 1, 2 and 3 can be easily pressed out of the molds and result in a very fine-pore open-cell foam.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
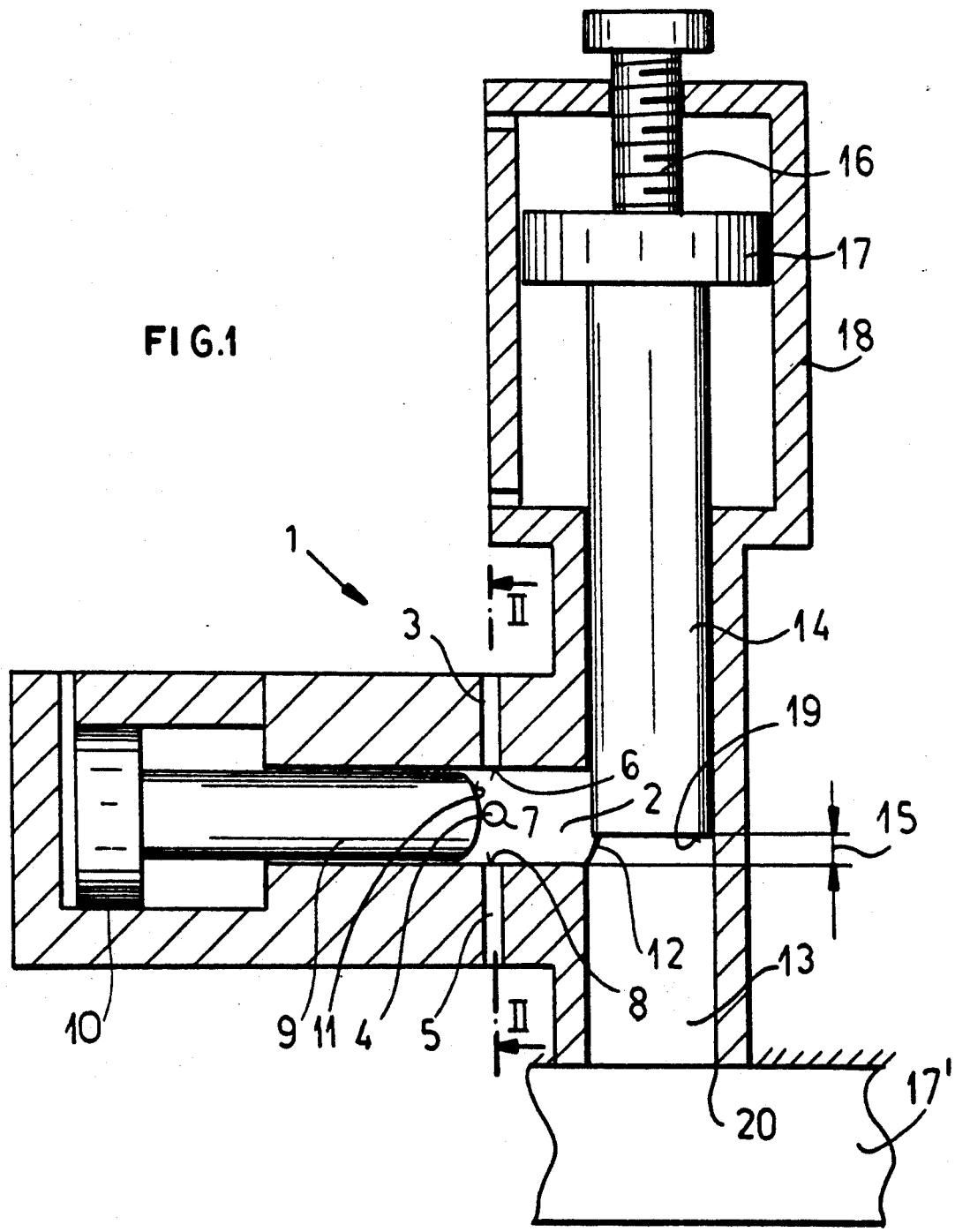
FIG. 1 is a schematic cross sectional view through a mixing head in accordance with the invention.
Figure 2:
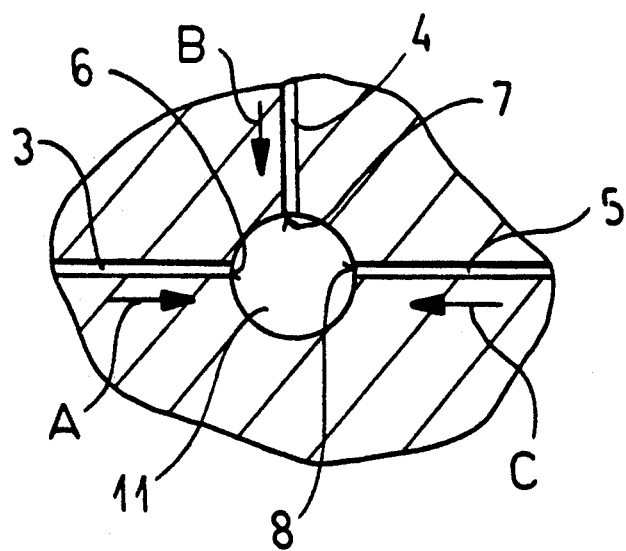
FIG. 2 is a cross sectional view taken along the lime II—II of FIG. 1.

The mixing head 1 shown in FIGS. 1 and 2 comprises a cylindrical mixing chamber 2 into which three distinct component feed passages 3, 4 and 5 open so that the passages 3 and 4 include an angle of 90° between them and the passages 4 and 5 include an angle of 90° between them. The feed passages 3, 4 and 5 serve to feed respectively the components A, B and C as above defined to the mixing chamber.

The inlet orifices 6, 7 and 8 are controlled with absolute time synchronization by a single reversible axially-shiftable mixing chamber piston 9 which can simultaneously close off all of the orifices 6–8 or open all of the orifices.

The mixing chamber piston 9 is actuatable by a hydraulic piston 10 and in the illustrated position in FIG. 1 is in its mixing position in which the inlet orifices 6, 7 and 8 are unblocked or freely open and the reactants contained in the components A, B and C at high pressure can intimately flow into the mixing chamber and intimately mix therein. In the blocked phase, with the piston 9 advanced to the right, the end face 11 of the piston 9 can lie flush with the outlet opening 12 of the mixing chamber 2 to close the latter and expel any residues from the mixing chamber.

In the mixing phase shown in FIG. 1, however, the reactive mixture from the components A–C flow at high velocity through the outlet opening 12 into a calming chamber 13 disposed at a right angle to the mixing chamber 2 and of a larger flow cross section. In the calming chamber, a further piston 14 is reversibly axially displaceable and can abut a positioning screw 16 which sets the width of a throttle gap 15 through which the reaction mixture is forced in the manner described into the mold cavity or chamber 17. The piston 14, moreover, is provided with a hydraulic actuating piston 17 in a cylinder 18 so that, at the end of the discharge of the reacting mixture into the mold cavity, and after the piston 9 has closed the orifices 6–8 and is advancing to the mouth 12, the piston 14 can drive any residue of the reaction mixture out of the calming chamber 13. Ultimately, the end 19 of the piston 14 will lie flush with the mouth 20 of the calming chamber 13.

Figure 3:
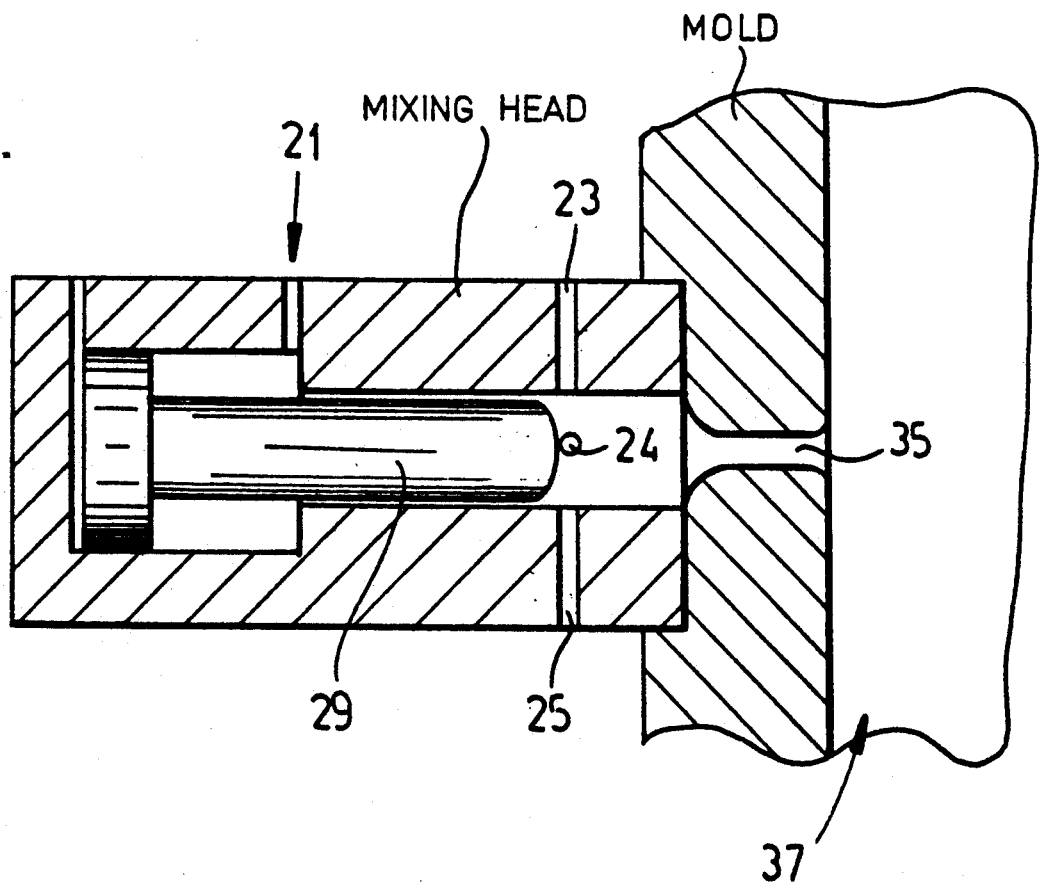
FIG. 3 is a cross sectional view illustrating another embodiment of a mixer according to the invention.

In FIG. 3, we have shown an embodiment in which the mixing chamber 22 of the mixing head 21 opens into the mold cavity 37 via a throttle orifice 35 corresponding to the throttle gap 15 previously mentioned but provided in a feed channel of the mold 40 communicating between the mixing chamber 22 and the cavity 37. As described in connection with FIGS. 1 and 2, separate feed passages 23, 24 and 25 can be provided for the components A, B and C, respectively, at right angles to one another so that the outlet orifices of these passages can be simultaneously blocked and unblocked by the mixing chamber piston 29.

The apparatus of FIG. 3 operates similarly to that of FIGS. 1 and 2 except that the reacting mixture from the mixing chamber 22 passes through the flow channels of the mold into the mold cavity rather than into a calming chamber before entering the mold. The examples previously given are appropriate to this embodiment of the mixing head as well.

We claim:
1. A method of producing a foamable mass of a polyurea elastomer, comprising the steps of:
   (a) forming a component A by combining at least one aliphatic polyether amine having primary amine functional groups and substantially devoid of free hydroxyl groups, a catalyst for polyurea elastomer formation having tertiary amino groups, carbon dioxide at least in part produced by reaction of carbamate with the aliphatic polyether amine and optional inert gases, and optional polyurea additives;
   (b) forming a component B as a polyisocyanate reactive to produce the polyurea elastomer or a prepolymer of the polyisocyanate;
   (c) forming as a component C, water reactive to produce the polyurea elastomer;
   (d) separately continuously feeding the components A, B and C through three separate passages into an elongated mixing chamber of a mixing head having a mixing chamber piston displaceable in said mixing chamber, and intensively mixing said components A, B and C in said chamber to form a mixture;
   (e) controlling the feeding of said components A, B and C into said mixing chamber from said passages by axially shifting said mixing chamber piston therein;
   (f) discharging said mixture from a mouth of said mixing chamber into a discharge chamber;
   (g) during discharge of said mixture from said mixing chamber into said discharge chamber, partly obstructing said mouth to form a throttle gap through which said mixture is forced; and
   (h) delivering said mixture from said discharge chamber into a chamber to enable said mixture to foam into a mass of said polyurea elastomer.

2. The method defined in claim 1, further comprising the step of controlling the pressure of said components A, B and C in said passages immediately before said components enter said mixing chamber so that the pressure of said components A, B and C is between 80 and 180 bar.

3. The method defined in claim 2 wherein the pressures are controlled so that the pressures in said passages of components A and B immediately before entry into said mixing chamber is 140 to 160 bar and the pressure in the passage of component C immediately before entry into said mixing chamber is 80 to 110 bar.

4. The method defined in claim 2, further comprising the step of controlling temperatures of the components A, B and C in said passages so that said temperatures range between 20° C. and 60° C. immediately before entry of said components A, B and C into said mixing chamber.

5. The method defined in claim 4, further comprising the step of controlling rates of flow of said components A, B and C through said passages into said mixing chamber and selecting a volume of said mixing chamber so that said mixture flows through said gap at a velocity of 8 to 16 m/s.

6. The method defined in claim 5 wherein said mouth is obstructed by displacing a slider transversely to an axis of said mixing chamber in said discharge chamber.

7. The method defined in claim 1 wherein said mouth is obstructed by forming a channel through which said mixing chamber is discharged into a mold with a constriction.

8. The method defined in claim 1 wherein said discharge chamber is a calming chamber lying at a right angle to said mixing chamber and of a cross section greater than that of said mixing chamber, said discharge chamber being formed with a reversibly axially displaceable plunger defining said gap and adjustably obstructing said mouth.

9. The method defined in claim 1 wherein said passages feed said components A, B and C into said mixing chamber in a common plane and from locations offset at 90° to one another around an axis of said mixing chamber.

* * * * *